United States Patent [19]

Parker

[11] Patent Number: 4,658,660
[45] Date of Patent: Apr. 21, 1987

[54] BOOSTER MOUNTING ARRANGEMENT
[75] Inventor: Donald L. Parker, Middletown, Ohio
[73] Assignee: General Motors Corporation, Detroit, Mich.
[21] Appl. No.: 826,887
[22] Filed: Feb. 6, 1986
[51] Int. Cl.⁴ ............................................ F16H 21/44
[52] U.S. Cl. ...................... 74/102; 403/199; 248/231.9; 248/222.2; 248/27.1; 74/512
[58] Field of Search .............. 74/102, 512; 248/231.9, 248/222.2, 222.1, 73, 27.1; 403/199, 262, 238, 71

[56] References Cited
U.S. PATENT DOCUMENTS

| 1,041,067 | 10/1912 | Graham | 74/102 |
| 1,586,454 | 5/1926 | McTague | 74/512 |
| 2,808,705 | 10/1957 | Ingres | 74/512 |
| 2,884,803 | 5/1959 | Willis | 74/512 |
| 4,022,081 | 5/1977 | Dodd et al. | 74/512 |
| 4,509,878 | 4/1985 | Bryson et al. | 403/199 |

Primary Examiner—Kenneth Downey
Assistant Examiner—Gerald A. Anderson
Attorney, Agent, or Firm—D. D. McGraw

[57] ABSTRACT

A booster assembly is attached to a dash panel by a slotted hinge arrangement at the top of the booster mounting bracket and bolts in apertures at the bottom. The push rod is connected to the brake pedal in such a manner that the entire mounting and connection operation may be accomplished from the forward side of the dash.

4 Claims, 3 Drawing Figures

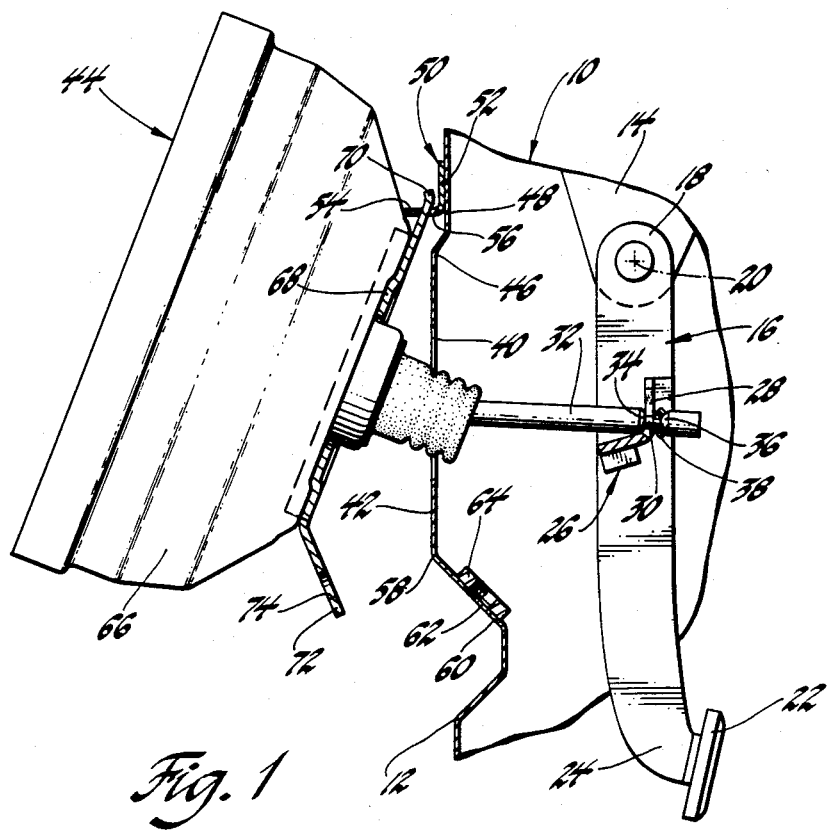
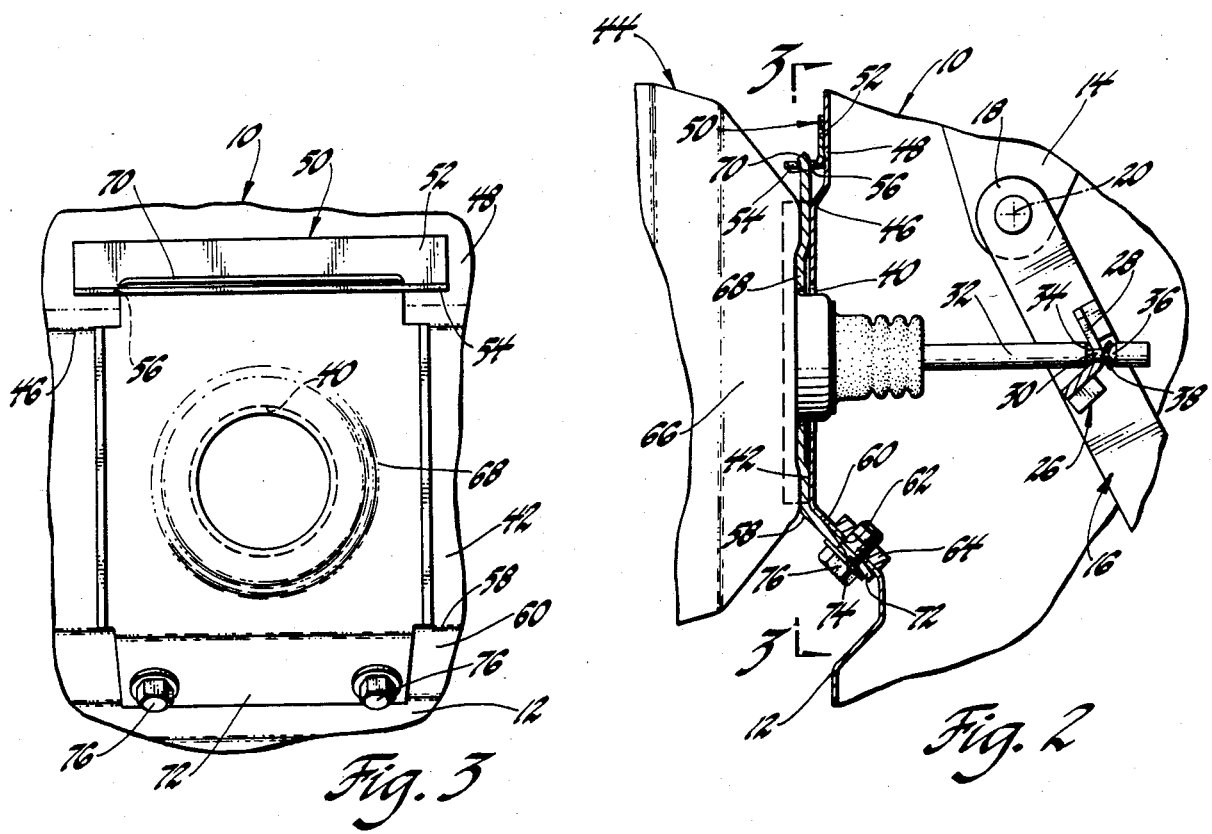
Fig. 1
Fig. 3
Fig. 2

BOOSTER MOUNTING ARRANGEMENT

The invention relates to a mounting arrangement for a booster assembly, and more particularly to one for a brake booster assembly which can be mounted from the forward side of the vehicle dash, including attachment of the booster push rod to the actuating pedal arm. The invention particularly provides a pivoting type mounting arrangement for a brake booster assembly wherein the brake booster has a mounting bracket which is pivotally mated with a mounting bracket on the forward side of the vehicle dash. The booster push rod is inserted through an opening in the dash, and the push rod is connected to the operating pedal for actuation upon completion of assembly without further attachment operations being required within the passenger compartment of the vehicle. The booster is then pivoted into position so that the booster mounting bracket is in surface engagement with a portion of the vehicle dash and the mounting bracket is then secured to the vehicle dash by suitable fastening means. Once so secure, the input push rod remains in proper position on the operating pedal and is not removable therefrom without partially detaching the booster so that it may be pivoted back to the pre-installation position.

It is a feature of the preferred embodiment of the invention to provide the pivoting portion of the mounting arrangement at the top of the booster assembly mounting bracket and the parts secured by bolts or other suitable means at the bottom portion thereof. This permits the booster assembly to be inserted from an upward area downwardly and rearwardly with a minimum amount of interference with other mechanisms which are commonly located forward of the vehicle dash. This also makes servicing the booster assembly easier.

It is another feature of the invention to provide the booster mounting bracket at the pivoting end as a cantilevered type spring to help hold the booster assembly tightly in position against the forward side of the dash when the fastening means are attached.

It is still another feature of the invention to provide the portion of the booster mounting bracket through which the mounting means such as bolts are inserted to be so positioned, together with the associated portion of the vehicle dash to which the bolts are attached, that the actuating force on the booster assembly when the pedal arm is actuated is transmitted back to the dash from the mounting bracket substantially in the plane of the portions of the mounting bracket and dash receiving the bolts. Therefore these mounting bracket and dash portions are not loaded in a bending load manner, but are loaded in directions along the planes occupied by them. This provides less tendency for those portions of the mounting bracket and the vehicle dash to be loaded in bending relation and therefore possibly contribute to metal fatigue in that area from such bending loads.

The connection between the input push rod and the pedal arm is more particularly disclosed and claimed in concurrently filed U.S. application Ser. No. 826,893 entitled "Push Rod to Pedal Arm Connection", and assigned to the common assignee. Reference is therefore made to that application for a more complete description of that connection.

In the Drawing:

FIG. 1 is a fragmentary elevation view, with parts broken away and in section, of a portion of a vehicle showing a booster assembly mounting arrangement embodying the invention. The booster assembly has been positioned for final pivoting movement before being secured in place.

FIG. 2 is a fragmentary view of a portion of the mechanism shown in FIG. 1, illustrating in particular the mounting arrangement of the booster assembly after it has been pivoted in position and secured in place, with the actuating pedal arm in the released position.

FIG. 3 is a view taken in the direction of arrows 3—3 of FIG. 2 and showing the booster mounting bracket and its relationship to portions of the vehicle dash, including its manner of attachment thereto.

The fragmentary portion of the vehicle 10 of the drawing includes a dash 12 and a mounting panel or bracket 14. A pedal arm 16 is pivotally secured at its upper end 18 to bracket 14 so as to pivot about pivot axis 20 in fore-and-aft movements in a plane which is substantially parallel to the plane of bracket 14. Pedal arm 16 has a pedal 22 secured to its lower end 24, as is well known in the art. In the typical installation, pedal 22 is a brake pedal. Pedal arm 16 has a bracket 26 secured to one side thereof, the upper portion of the bracket having a slot 28 formed therein to receive a reduced diameter portion 30 of a push rod 32. The reduced diameter portion 30 is defined by axially spaced rounded shoulders 34 and 36 which operatively engage opposite sides of the bracket 26 when the reduced diameter portion 30 is in the inner or bottom end of slot 28 as shown. A rubber bumper 38 is preferably positioned between shoulder 36 and bracket 26 to eliminate click noises upon quick release of the pedal 22.

Dash 12 has an opening 40 formed therethrough and the surrounding portion of the dash provides a face surface 42 on the forward side of the dash, which is the side opposite to where pedal arm 16 is located. As is usual in a vehicle, the pedal arm 16 and pedal 22 are located in the vehicle passenger compartment. The compartment on the other side of dash 12 may be an engine compartment, a luggage compartment, or some other compartment provided as a part of the vehicle, the compartment being adapted to contain the booster assembly 44.

When the booster assembly 44 is used in a brake system, it actuates a master cylinder which may be secured to the booster assembly. The push rod 32 is the input member of the booster assembly 44, and when actuated controls the booster control valving to actuate and release the booster assembly in a manner well known in the art. The face surface 42 of the dash 12 has an offset or bend 46 so as to position a portion 48 of dash 12 slightly rearwardly of the plane of the face surface 42. A mounting bracket 50 is secured to dash portion 48. Bracket 50 is illustrated as being generally L-shaped in cross section, with one side 52 thereof being secured to the dash portion 48 and the other side 54 thereof projecting forwardly from the dash portion 48 beyond the plane of the face surface 42. A slot 56 is formed in bracket side 54 and, as best shown in FIG. 3, extends laterally so that it is parallel to a diameter of opening 40, but spaced therefrom. Slot 56 is preferably in the extended plane of face surface 42.

In the preferred arrangement, the bracket 50 and its slot 56 are provided over opening 40 so that the pivoting action of the booster assembly 44 to be described occurs at the upper portion of the mounting arrangement. It is to be understood, however, that in some circumstances it may be desirable to locate bracket 50 and its slot 56 at other than directly above opening 40. It may be positioned at either side of the opening or at the bottom of the opening, by way of example, or at any point in between. Further description of the invention, however, will relate to the preferred embodiment illustrated with the pivoting mechanism at the top of the mounting arrangement.

The lower portion of the face surface 42 is bent at bend 58 so that the lower face portion 60 forms an acute angle with the extended plane of face surface 42 as portion 60 is bent out of that plane. Lower face portion 60 has bolt holes 62 formed therethrough, one such bolt hole being illustrated in FIGS. 1 and 2. On the opposite side of the lower face portion 60 of face surface 42 a threaded nut 64 is secured in alignment with each of the bolt holes 62.

The booster assembly 44 has its housing 66 provided with a booster mounting bracket 68 secured to the rear side of the housing. Mounting bracket 68 has a tang 70 formed on the upper side thereof, the tang 70 being receivable within the slot 56 to cooperate with the bracket side 54 to provide the pivotal arrangement for booster installation. The other side of bracket 68 from booster housing 66 is in surface engageable relation with the face surface 42 of dash 12. The side of slot 54 engaged by the side of tang 70 facing the booster housing 66 is preferably closer to dash portion 48 than the extended plane of face surface 42 plus the thickness of bracket 68. This assures a tight fit by cantilever spring loading the tang 70 when the booster assembly is secured in place as shown in FIG. 2.

Another tang 72 is provided on the lower end of the booster mounting bracket 68. This tang has bolt holes 74 formed therethrough which will be aligned with the bolt holes 62 when the booster is pivoted into position. Tang 72 is preferably bent at an acute angle out of the extended plane of the main portion of the bracket 68 so that it fits about the bend 58 and in surface engagement with the lower face portion 60 of dash 12 when the booster is in the installed position. This is clearly illustrated in FIG. 2.

Before the booster assembly 44 is installed, the pedal arm 16 is depending vertically from the vehicle body mounting bracket 14 about pivot axis 20. The booster assembly 44 is positioned on the forward side of dash 12 with the push rod 32 being inserted through opening 40 so that the push rod reduced diameter portion 30 is positioned at the top of bracket slot 28. The push rod may then be released and it will slide downwardly so that the reduced diameter portion 30 will rest in the inner end of slot 28, all as more particularly disclosed and claimed in the above noted application Ser. No. 826,893 filed on concurrent date herewith. The booster tang 70 is then inserted through slot 56 of bracket side 54 so that the booster assembly is in the position shown in FIG. 1. The booster is then pivoted downwardly so that the bolt holes 74 are in axial alignment with the bolt holes 62. This downward pivotal movement will act through the push rod 32 and the pedal bracket 26 to move the pedal arm 16 in a pivotal manner about axis 20 to the released position shown in FIG. 2. Bolts 76 are then inserted through the bolt holes and threaded into the appropriate nuts 64 so as to tightly secure the booster assembly in place. Because of the relationship of the slot 56 to the extended plane of the face surface 42 as above described, a cantilever force will be exerted on the booster mounting bracket tang 70. Thus tang 70 is spring loaded. It acts in cooperation with bolts 76 to hold the booster mounting bracket 68 and therefore the booster assembly 44 tightly in surface engagement with the surface 42. Due to the bend 58 of the dash and the similar bend for tang 72, the angle of tang 72 and the lower face portion 60 is such that when the pedal arm 16 is moved to actuate the booster assembly 44, the force transmitted from the booster assembly housing back to the dash 12 will be transmitted in a direction substantially in the plane of tang 72 and the plane of the lower face portion 60, placing the bolts 76 predominantly in shear. By transmitting the forces through the sheet metal tang 72 and the lower face portion 60 of the dash 12 in this manner, substantially no bending forces are exerted on them and there is therefore no bending action taking place in them which may tend to cause metal fatigue. The tang 70, acting as a cantilevered spring and extending sufficiently above dash offset 46 before it engages slot 56, acts under a load over the entire area of the tang which is considerably below that which will tend to cause any metal fatigue at this point.

The mounting arrangement provides an easy way to mount the booster assembly from the forward side of the dash, requires no additional interior passenger compartment operation to secure the push rod to the pedal arm 16, and results in a quick installation, saving both time and effort.

The embodiments of the invention in which an exclusive property or privilege is claimed are defined as follows:

1. A booster assembly mounting arrangement for installing and securing a booster assembly from one side of a dash, said mounting arrangement comprising:

a dash having an opening therethrough for receiving a part of a booster assembly including a booster input push rod, a bracket secured to one side of said dash in spaced relation to said opening, booster-supporting face means formed by a part of the one side of said dash around said opening, first bolt hole means on the opposite side of said opening from said bracket, said bracket including a portion extending outwardly from the one side of said dash, said bracket portion having laterally extending slot means formed therethrough and positioned in substantially planar alignment with said face means and located on a slot axis substantially parallel to a diameter of said opening, and threaded nut means secured to the other side of said dash in alignment with said first bolt hole means;

and a booster assembly having an input push rod extending through said opening and connected to a pedal arm for booster actuation, a mounting bracket secured to and forming a part of said booster assembly, said mounting bracket having first tang means mating with said slot means to form a pivoting mount and further having second tang means having second bolt hole means therethrough in alignment with said first bolt hole means, and bolt means extending through said first and said second bolt hole means and threadedly secured into said nut means and holding said mounting bracket against said dash face means, said first tang means when said bolt means are fully tightened being subjected to a cantilever force providing a spring load on said first tang means assuring tight face-supported contact of said mounting bracket and said face means.

2. A brake booster assembly mounting arrangement for installing and securing a brake booster assembly from one side of a vehicle dash, said mounting arrangement comprising:

a dash having an opening therethrough for receiving a part of a brake booster assembly, a bracket secured to one side of said dash in spaced relation to said opening, booster-supporting face means formed by a part of the one side of said dash around said opening, first bolt hole means on the opposite side of said opening from said bracket, said bracket including a portion extending outwardly from the one side of said dash, said bracket portion having laterally extending slot means formed therethrough and positioned in substantially planar alignment with said face means and located on a slot axis substantially parallel to a diameter of said opening, and threaded nut means secured to the other side of said dash in alignment with said first bolt hole means;

a pivotally mounted brake pedal arm having an angularly concave slotted mounting bracket with the slot therein opening upwardly;

brake booster assembly having an input push rod extending through said dash opening, said input push rod having a reduced diameter portion received in the slot of said mounting bracket and connected to said brake pedal arm in pivotal relation for booster actuation with the concave configuration of said slotted mounting bracket preventing said input push rod from exiting the slot after said booster assembly is secured to said dash, a booster assembly mounting bracket secured to and forming a part of said booster assembly, said booster assembly mounting bracket being provided with first tang means mating with said slot means to form a pivoting mount and further provided with second tang means having second bolt hole means therethrough in alignment with said first bolt hole means, and bolt means extending through said first and said second bolt hole means and threadedly secured into said nut means and holding said booster assembly mounting bracket against said dash face means, said first tang means when said bolt means are fully tightened being subjected to a cantilever force providing a spring load on said first tang means assuring tight face-supported contact of said booster assembly mounting bracket and said face means.

3. A booster assembly mounting arrangement for installing and securing a booster assembly from one side of a dash, said mounting arrangement comprising:

a dash having an opening therethrough for receiving a part of a booster assembly including a booster input push rod, a bracket secured to one side of said dash in spaced relation to and above said opening, booster-supporting face means formed by a part of the one side of said dash around said opening, first bolt hole means on the opposite side of said opening from said bracket, said bracket including a portion extending outwardly from the one side of said dash, said bracket portion having laterally extending slot means formed therethrough positioned in substantially planar alignment with said face means and located on a slot axis substantially parallel to the horizontal diameter of said opening, and threaded nut means secured to the other side of said dash in alignment with said first bolt hole means;

and a booster assembly having an input push rod extending through said opening and connected to a pedal arm for booster actuation, a mounting bracket secured to and forming a part of said booster assembly, said mounting bracket being provided with upwardly extending first tang means mating with said slot means to form a pivoting mount and further provided with second tang means having second bolt hole means therethrough in alignment with said first bolt hole means, and bolt means extending through said first and said second bolt hole means and threadedly secured into said nut means and holding said mounting bracket against said dash face means, said first tang means when said bolt means are fully tightened being subjected to a cantilever force providing a spring load on said first tang means assuring tight face-supported contact of said mounting bracket and said face means.

4. The mounting arrangement of any of claims 1, 2 or 3 wherein said dash face means has a bend providing a portion of said dash face means at an acute angle to the plane of the portion of said dash face means immediately surrounding said opening with said first bolt hole means being formed through said angularly bent portion of said dash face means so that said bolt means are at other than right angles to said bracket slot and the contacting surfaces of said second tang means and said angularly bent portion of said dash face means are in a plane positioned in angular relation to the face contact surfaces of said booster mounting bracket and the portion of said dash face means immediately surrounding said opening, the angle of bend being such that forces exerted on said second tang means and the angularly bent portion of said dash face means when the booster assembly is actuated by movement of the pedal arm are in the planes thereof rather than bending forces acting thereon.

* * * * *